US006232581B1

(12) United States Patent
Virzi

(10) Patent No.: US 6,232,581 B1
(45) Date of Patent: May 15, 2001

(54) CONNECTION FLANGE FOR AN ARMOURED RESISTANCE ELEMENT

(75) Inventor: Andrea Virzi, San Vendemiano (IT)

(73) Assignee: I.R.C.A. S.P.A. Inoustria Resistenze Corazzate E Affini, San Vendemiano (IT)

( * ) Notice: Subject to any disclaimer, the term of this patent is extended or adjusted under 35 U.S.C. 154(b) by 0 days.

(21) Appl. No.: 09/530,096

(22) PCT Filed: Dec. 3, 1998

(86) PCT No.: PCT/EP98/07874

§ 371 Date: Apr. 25, 2000

§ 102(e) Date: Apr. 25, 2000

(87) PCT Pub. No.: WO99/31939

PCT Pub. Date: Jun. 24, 1999

(30) Foreign Application Priority Data

Dec. 12, 1997 (IT) ............................................. VE97U0048

(51) Int. Cl.[7] .............................. A21B 1/00; A21B 1/22; A21B 11/00

(52) U.S. Cl. ............................................ 219/402; 219/537

(58) Field of Search .................................... 219/405, 447, 219/404, 403, 402, 536, 459.1, 401, 408, 388, 537; 392/370, 487

(56) References Cited

U.S. PATENT DOCUMENTS 3,585,360 * 6/1971 Young et al. ........................ 219/405
3,693,538 * 9/1972 Synder .................................. 99/447
3,899,655 * 8/1975 Skinner ............................... 219/404
3,982,096 * 9/1976 Dills .................................... 219/403
4,020,323 * 4/1977 Dills .................................... 219/405
4,049,948 * 9/1977 Gilreath .............................. 219/404
4,295,035 * 10/1981 Drugmand .......................... 219/536
4,546,236 * 10/1985 Janson ................................ 392/370
4,629,865 * 12/1986 Freedman et al. .................. 219/405
4,767,915 * 8/1988 Hurley ............................. 219/459.1
4,829,158 5/1989 Burnham ............................. 219/400
4,839,502 * 6/1989 Swanson et al. .................... 219/401
5,021,635 * 6/1991 Willett ................................. 219/408
5,132,519 * 7/1992 Jackson et al. ...................... 219/388
5,808,279 * 9/1998 Nichilo ................................ 219/537
6,008,478 * 12/1999 Crone et al. ........................ 219/402
6,097,003 * 8/2000 Markum et al. ..................... 219/402
6,154,608 * 11/2000 Rochelle ............................. 392/487

FOREIGN PATENT DOCUMENTS

A1338285 10/1989 (EP) .

* cited by examiner

*Primary Examiner*—Teresa Walberg
*Assistant Examiner*—Leonid Fastovsky
(74) *Attorney, Agent, or Firm*—Birch, Stewart, Kolasch & Birch, LLP

(57) ABSTRACT

A connection flange for an armored resistance element, particularly for electric ovens, has a plate provided with a plurality of holes for insertion of end portions of the armored resistance element. Minor edges of the plate are extended into at least two profiled flat fins with their sides diverging outwards. The fins are formed during actual stamping of the plate and then are bent at 90° to be inserted into corresponding slots provided in the edges of the oven, after which they are twisted to prevent their withdrawal.

4 Claims, 2 Drawing Sheets

FIG. 1
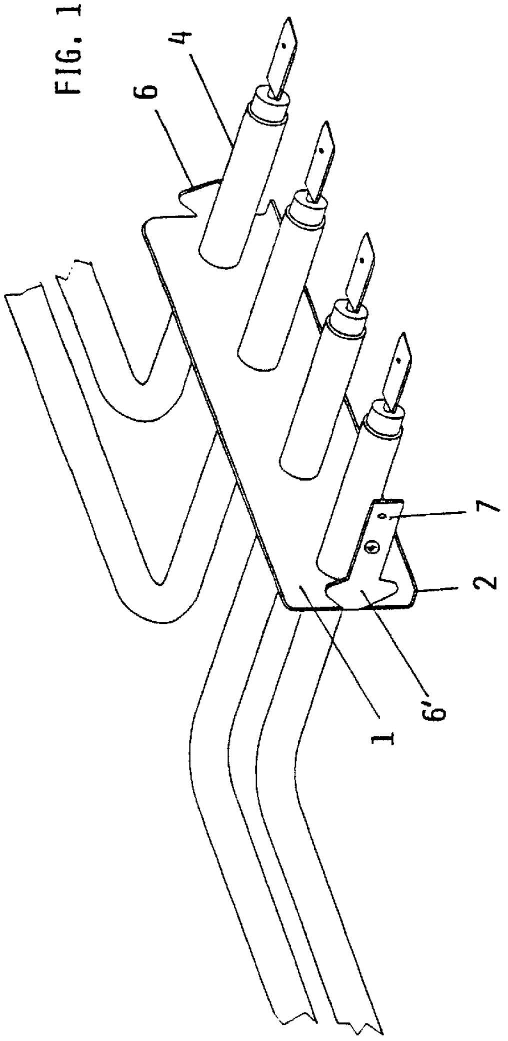
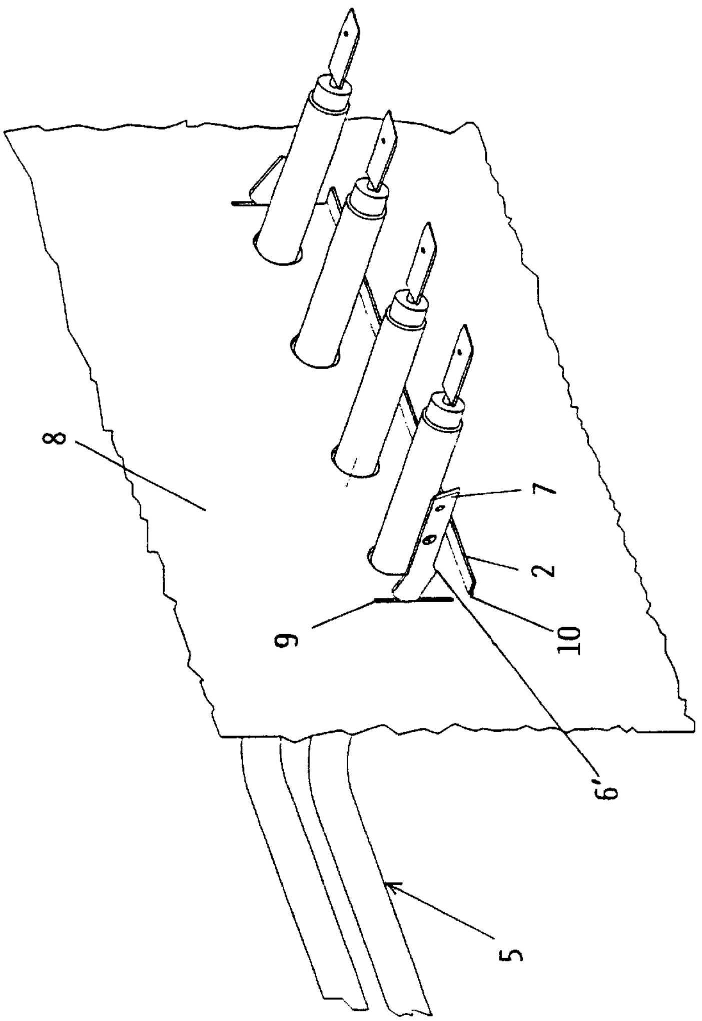
FIG. 4

CONNECTION FLANGE FOR AN ARMOURED RESISTANCE ELEMENT

This application is the national phase under 35 U.S.C. § 371 of PCT International Application No. PCT/EP98/07874 which has an International filing date of Apr. 25, 2000, which designated the United States of America.

1. Field of the Invention

This invention relates to a connection flange for an armoured resistance element.

2. Description of the Prior Art

Armoured resistance elements are known for heating electric ovens. Specifically, the armoured resistance element consists of a resistive electric wire housed in a metal sheath and separated therefrom by an interposed dielectric material, such as magnesium oxide. The ends of the metal sheath are generally straight and parallel and engage in corresponding holes provided in a stainless steel, iron or aluminium flange which is fixed to the oven muffle on mounting the resistance element.

The flange is constructed by stamping and is often provided with a plurality of prewelded or preformed screws to be inserted into holes provided in the muffle and engagable by corresponding nuts. In many case there is also welded to the flange a flat lug engagable by a push-on connector provided on the muffle edge to together form continuity elements for the earthing contact.

These known flanges have however certain drawbacks and in particular:

- a substantial production cost due to the provision of the screws and nuts and to the work involved in fixing the screws and lug to the flange,
- time lost in effecting this work,
- insufficient product quality in the sense that the screws and lug can twist or separate from the flange during transportation, or the screw threads can be damaged during the tightening of the nuts,
- a large number of rejects/returns by the manufacturer account of the aforesaid problem.

object of the invention is to eliminate these drawbacks by providing a flange for resistance elements which can be easily fixed to the oven muffle without requiring the provision of screws.

A further object is to provide a low-cost flange easily constructed by stamping.

BRIEF SUMMARY OF THE INVENTION

These and further objects are attained according to the invention through A connection flange for an armoured resistance element, particularly for electric ovens, comprising a plate provided with a plurality of holes for insertion by end portions of said armoured resistance element, wherein minor edges of said plate are prolonged into at least two profiled flat fins with their sides diverging outwards, said fins being formed during actual stamping of said plate and then being bent at 90° to be inserted into corresponding slots provided in said edges of said oven, after which they are twisted to prevent their withdrawal.

BRIEF DESCRIPTION OF THE DRAWINGS

The invention is described in detail hereinafter with reference to the accompanying drawings on which:

FIG. 1 is a perspective view of a flange according to the invention,

FIG. 4 shows it mounted on the muffle of an oven.

DESCRIPTION OF PREFERRED EMBODIMENTS

Figure 2:
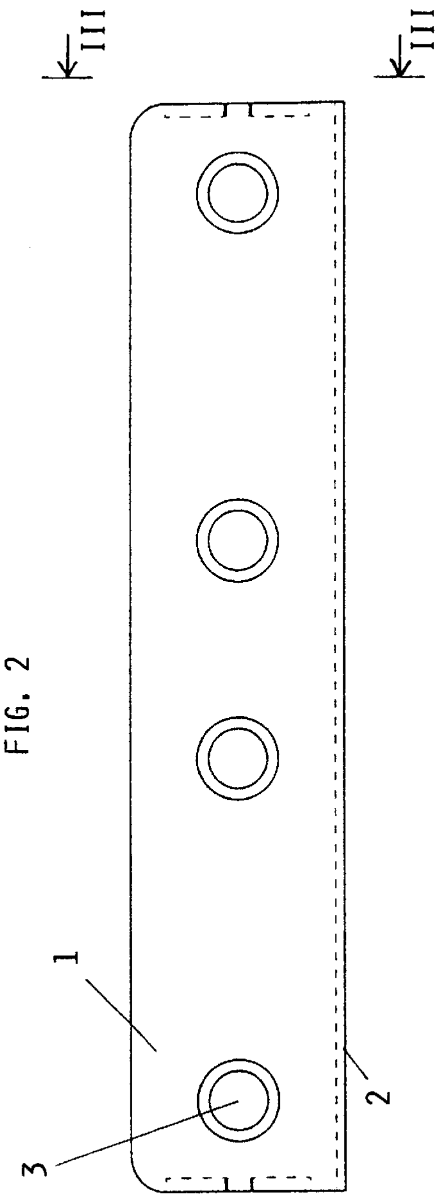
FIG. 2 is a side view thereof in the direction III—III of FIG. 2.
Figure 3:
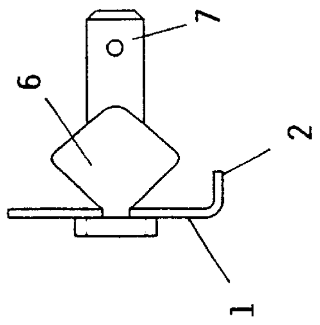
FIG. 3 is a side view thereof.

As can be seen from the drawings, the flange of the invention for an armoured resistance element comprises a stainless steel plate 1 having a thickness of about 1 mm and of rectangular shape, with one of its longitudinal edges bent at 90° to provide plate rigidity. The plate is provided with four holes 3 for passage of the end portions 4 of an armoured resistance element 5.

The plate is prolonged on both its minor sides in the form of two flat profiled fins 6,6' formed during the flange blanking on operation, they being substantially of rhomboidal shape with one diagonal substantially aligned with the plate longitudinal axis.

One 6' of the fins extends in the form of a lug of suitable shape and thickness to act as an earthing contact element for a push-on connector rigid with the edge of the muffle 8. In some cases both the fins extend in the form of lugs.

The flange of the invention is used as follows: the plate 1, the two fins 6,6' and the lug 7 are formed during the same stamping operation, one 2 of the two longitudinal edges of the plate and the fins 6,6' then being bent at 90°, after which the armoured resistance element is fixed in the plate holes 3 such that its terminals 4 lie on that side of the plate towards which the fins 6,6' have been bent.

The resistance element assembled in this manner is applied to the muffle 8 by inserting the fins 6,6' into suitable vertical slots 9, the length of which corresponds to the dimensions of the diagonal of the fin, and the bent edge 2 is inserted into a corresponding slot 10.

When the fins 6,6' have passed through the slots 9 they are slightly twisted to prevent them withdrawing from the slots by virtue of their interference with the muffle walls, so providing a secure connection between the armoured resistance element and the muffle. The lug 7 is then engaged by a traditional push-on connector to form the earthing contact.

From the aforegoing it is apparent that the flange of the invention has numerous advantages, and in particular:

- it can be easily fixed to the oven muffle without requiring the provision of screws or other fixing members,
- it incorporates an earthing contact lug,
- it is of low cost as the fins and lug are formed during the actual flange blanking operation.

I claim:

1. A connection flange for an armoured resistance element, particularly for electric ovens, comprising a plate provided with a plurality of holes for insertion by end portions of said armoured resistance element, wherein minor edges of said plate are prolonged into at least two profiled flat fins with their sides diverging outwards, said fins being formed during actual stamping of said plate and then being bent at 90° to be inserted into corresponding slots provided in said edges of said oven, after which they are twisted to prevent their withdrawal.

2. A flange as claimed in claim 1, wherein at least one of said fins is prolonged into a lug.

3. A flange as claimed in claim 1, wherein said fins are of rhomboidal shape.

4. A flange as claimed in claim 1, wherein at least one major edge is bent at 90°.

* * * * *

UNITED STATES PATENT AND TRADEMARK OFFICE

CERTIFICATE OF CORRECTION

PATENT NO. : 6,232,581 B1
DATED : May 15, 2001
INVENTOR(S) : Andrea Virzi

It is certified that error appears in the above-identified patent and that said Letters Patent is hereby corrected as shown below:

Title page,
Item [73] Assignee, please correct the assignee's name "I.R.C.A. S.P.A. Inoustria Resistenze Corazzate E. Affini" to -- I.R.C.A. S.P.A. Industria Resistenze Corazzate E. Affini --.

Signed and Sealed this

Thirteenth Day of November, 2001

*Attest:*

Nicholas P. Godici

NICHOLAS P. GODICI

*Attesting Officer*

*Acting Director of the United States Patent and Trademark Office*